US007506090B2

(12) United States Patent
Rudnick et al.

(10) Patent No.: US 7,506,090 B2
(45) Date of Patent: Mar. 17, 2009

(54) SYSTEM AND METHOD FOR USER-CONFIGURABLE RESOURCE ARBITRATION IN A PROCESS CONTROL SYSTEM

(75) Inventors: Juergen Rudnick, Hanau (DE); Jianhua Zhao, Ringoes, NJ (US)

(73) Assignee: Honeywell International Inc., Morristown, NJ (US)

( * ) Notice: Subject to any disclaimer, the term of this patent is extended or adjusted under 35 U.S.C. 154(b) by 13 days.

(21) Appl. No.: 11/453,119

(22) Filed: Jun. 14, 2006

(65) Prior Publication Data

US 2007/0294450 A1    Dec. 20, 2007

(51) Int. Cl.
*G06F 12/00* (2006.01)
(52) U.S. Cl. .................. 710/240; 710/241; 710/242; 710/243; 710/244; 710/313
(58) Field of Classification Search ......... 710/240–244, 710/113, 313; 709/103, 229; 370/447
See application file for complete search history.

(56) References Cited

U.S. PATENT DOCUMENTS

| | | | |
|---|---|---|---|
| 5,191,642 A | 3/1993 | Quick et al. | |
| 5,202,990 A | 4/1993 | Saikawa | |
| 5,392,432 A | 2/1995 | Engelstad et al. | |
| 5,394,324 A | 2/1995 | Clearwater | |
| 5,424,958 A | 6/1995 | Knupp | |
| 5,729,749 A | 3/1998 | Ito | |
| 5,838,968 A | 11/1998 | Culbert | |
| 5,867,667 A | 2/1999 | Butman et al. | |
| 5,974,439 A | 10/1999 | Bollella | |
| 6,049,798 A | 4/2000 | Bishop et al. | |
| 6,157,840 A | 12/2000 | Hogberg et al. | |
| 6,282,561 B1 | 8/2001 | Jones et al. | |
| 6,317,638 B1 | 11/2001 | Schreder et al. | |
| 6,578,005 B1 | 6/2003 | Lesaint et al. | |
| 6,591,253 B1 | 7/2003 | Dinkin et al. | |
| 6,691,280 B1 | 2/2004 | Dove et al. | |
| 6,829,647 B1 * | 12/2004 | Biran et al. | 709/229 |
| 2003/0135537 A1 * | 7/2003 | Mikael et al. | 709/103 |
| 2003/0156597 A1 * | 8/2003 | Eberle et al. | 370/447 |
| 2006/0101179 A1 * | 5/2006 | Lee et al. | 710/113 |

OTHER PUBLICATIONS

"TotalPlant Batch Specification and Technical Data" Release 3.0, Honeywell, Apr. 29, 2002, 59 pages.
"Semaphone (programming)", 3 pages, http://en.wikipedia.org/wiki/Semaphore_(programming).
Lee et al., A Collaborative Scheduling System for Make-to-Order Manufacturing, CIRP Annals, Technische Rundschau, Berne, CH, vol. 45, No. 1, 1996, pp. 461-464.

* cited by examiner

*Primary Examiner*—Clifford H Knoll
*Assistant Examiner*—Kim T Huynh
(74) *Attorney, Agent, or Firm*—Munck Carter, P.C.

(57) ABSTRACT

A system includes at least one memory and at least one processor. The at least one memory is operable to store a resource object associated with a resource. The at least one memory is also operable to store a plurality of requester objects associated with at least a portion of one or more processes. The one or more processes are associated with production of one or more products using the resource. The at least one processor is operable to arbitrate between multiple arbitration requests from multiple ones of the requester objects. Each arbitration request indicates that one of the requester objects is attempting to acquire the resource object so that the associated resource is used to produce one of the products. The at least one processor is operable to use one or more user-defined strategies to arbitrate between the multiple arbitration requests.

26 Claims, 9 Drawing Sheets

SYSTEM AND METHOD FOR USER-CONFIGURABLE RESOURCE ARBITRATION IN A PROCESS CONTROL SYSTEM

TECHNICAL FIELD

This disclosure relates generally to control systems and more specifically to a system and method for user-configurable resource arbitration in a process control system.

BACKGROUND

Processing facilities are often managed using process control systems. Example processing facilities include chemical and pharmaceutical production plants. Among other operations, process control systems typically interact with and control industrial equipment in the processing facilities, such as equipment used to produce chemical and pharmaceutical products.

Processing facilities may implement a single process having tasks that require the use of the same resources, such as certain pieces of industrial equipment. Processing facilities may also implement multiple processes that are executed at the same time and that require the use of the same resources. It is often necessary or desirable for a process control system to manage the use of resources by these multiple processes or tasks. Part of this management often involves determining how to share resources between different processes or tasks in a production facility.

SUMMARY

This disclosure provides a system and method for user-configurable resource arbitration in a process control system.

In a first embodiment, a system includes at least one memory and at least one processor. The at least one memory is operable to store a resource object associated with a resource. The at least one memory is also operable to store a plurality of requester objects associated with at least a portion of one or more processes. The one or more processes are associated with production of one or more products using the resource. The at least one processor is operable to arbitrate between multiple arbitration requests from multiple ones of the requester objects. Each arbitration request indicates that one of the requester objects is attempting to acquire the resource object so that the associated resource is used to produce one of the products. The at least one processor is operable to use one or more user-defined strategies to arbitrate between the multiple arbitration requests.

In a second embodiment, a method includes creating a resource object associated with a resource and creating a plurality of requester objects associated with at least a portion of one or more processes. The one or more processes are associated with production of one or more products using the resource. The method also includes submitting arbitration requests from the plurality of requester objects to the resource object. Each arbitration request indicates that one of the requester objects is attempting to acquire the resource object so that the associated resource is used to produce one of the products. In addition, the method includes arbitrating between multiple arbitration requests from multiple ones of the requester objects using one or more user-defined strategies.

In a third embodiment, a computer program is embodied on a computer readable medium and is operable to be executed by a processor. The computer program includes computer readable program code for creating a resource object associated with a resource and for creating a plurality of requester objects associated with at least a portion of one or more processes. The one or more processes are associated with production of one or more products using the resource. The computer program also includes computer readable program code for arbitrating between multiple arbitration requests from multiple ones of the requester objects using one or more user-defined strategies. Each arbitration request indicates that one of the requester objects is attempting to acquire the resource object so that the associated resource is used to produce one of the products.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
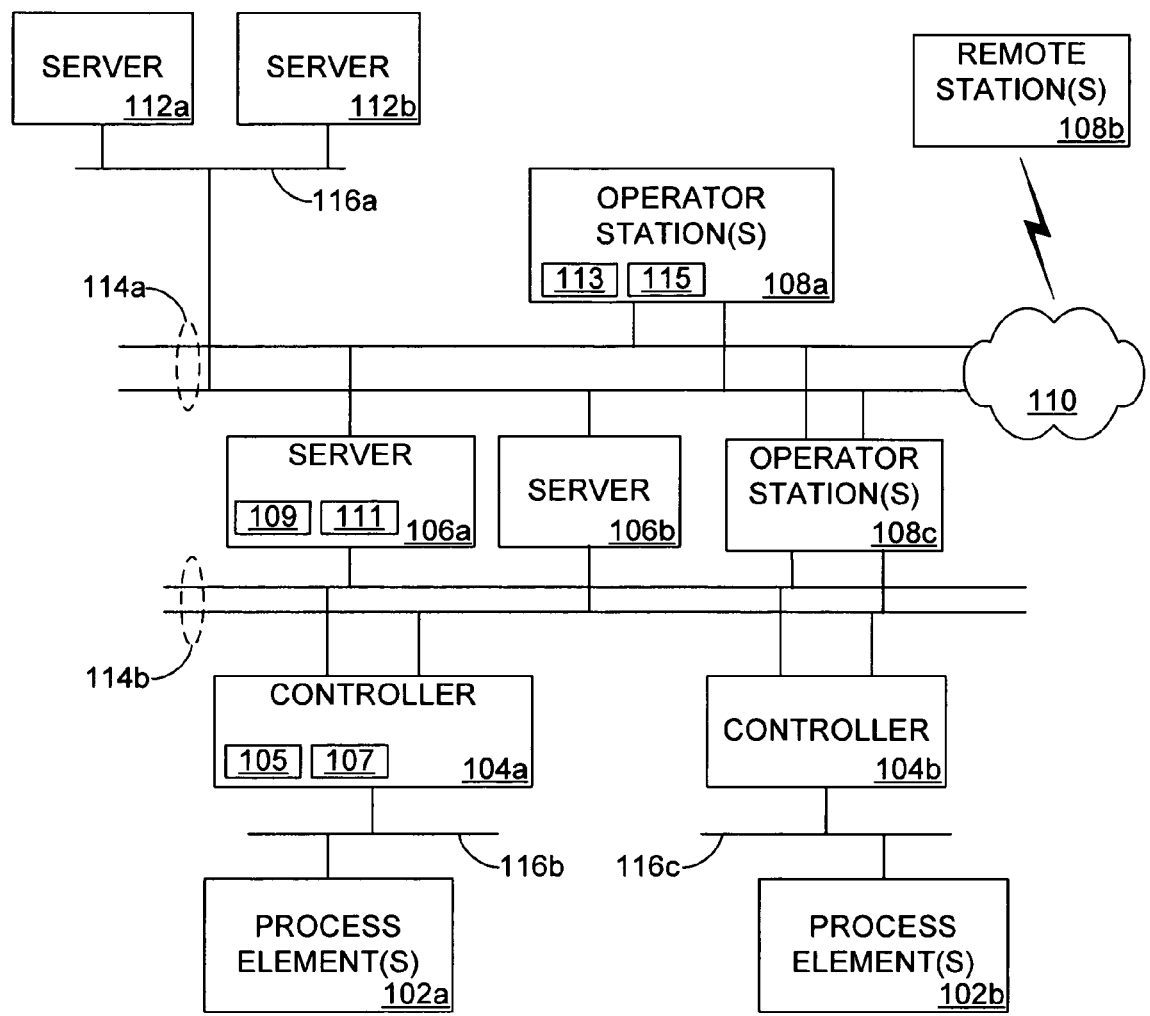
FIG. 1 illustrates an example process control system in accordance with this disclosure.

FIG. 1 illustrates an example process control system 100 in accordance with this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent equipment used to manufacture chemical or pharmaceutical products. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b for controlling the production of chemical or pharmaceutical products. Each of the controllers 104a-104b includes any hardware, software, firmware, or combination thereof for controlling one or more of the process elements 102a-102b. The controllers 104a-104b could, for example, include one or more processors 105 and one or more memories 107 storing data and instructions used by the processor(s) 105. As particular examples, the processors 105 could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors 109 and one or more memories 111 storing data and instructions used by the processor(s) 109 (such as software executed by the servers 106a-106b). As particular examples, the processors 109 could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. Each of the operator stations 108a-108c could, for example, include one or more processors 113 and one or more memories 115 storing data and instructions used by the processor(s) 113 (such as software executed by the operator stations 108a-108c). In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, the process control system 100 manages one or multiple processes involving shared resources (such as the process elements 102a-102b). As a particular example, the controllers 104a-104b and the servers 106a-106b could manage one or multiple processes used to produce chemical or pharmaceutical products. Often times, multiple tasks within a single process or multiple processes overlap in their use of particular resources in the process control system 100. In other words, a single resource can be used in more than one process or for more than one task in the same process. This gives rise to competing uses of the resources, which typically requires that use of the resources be arbitrated by a resource arbitration mechanism. The resource arbitration mechanism selects which processes or tasks are allowed to use particular resources and when. Through the use of a resource arbitration mechanism, the process control system 100 may help to ensure that processes and tasks use the process elements 102a-102b and other resources more effectively or efficiently.

In accordance with this disclosure, a user-configurable resource arbitration mechanism is provided. The user-configurable resource arbitration mechanism may allow a user to combine strategies for controlling a processing or production facility with user-configurable resource arbitration strategies. The user-configurable resource arbitration mechanism may be highly flexible, such as through various system and user options that allow the mechanism to be adapted to different control systems and applications. The user-configurable resource arbitration mechanism may also be highly scalable and may provide for the automatic recovery from many operational, engineering, and other failures in the process control system 100. Further, the user-configurable resource arbitration mechanism could be used in hard and soft real-time environments by guaranteeing fixed response times and dedicated failure rates. In addition, the user-configurable resource arbitration mechanism may be used in distributed and non-distributed control systems, and zero incremental engineering effort may be required for use with distributed resources versus non-distributed resources.

Various details regarding the user-configurable resource arbitration mechanism are shown in the remaining figures, which are described below. The user-configurable resource arbitration mechanism could be implemented in or supported by any suitable component or components in the process control system 100, such as the controllers 104a-104 b, the servers 106a-106b, or the operator stations 108a-108 c.

Although FIG. 1 illustrates one example of a process control system 100, various changes may be made to FIG. 1. For example, a control system could include any number of process elements, controllers, servers, operator stations, and networks. Also, the makeup and arrangement of the process control system 100 is for illustration only. Components could be added, omitted, combined, or placed in any other suitable configuration according to particular needs. Further, while described as being used to produce chemical or pharmaceutical products, the process control system 100 could be used in any other suitable manner. In addition, FIG. 1 illustrates one operational environment in which user-configurable resource arbitration can be used. The user-configurable resource arbitration mechanism could be used in any other suitable device or system.

FIGS. 2A through 10 illustrate an example user-configurable resource arbitration mechanism in a process control system in accordance with this disclosure. The details of the user-configurable resource arbitration mechanism shown in FIGS. 2A through 10 are for illustration only. Particular implementations of the user-configurable resource arbitration mechanism could vary from that shown in FIGS. 2A through 10. Also, for ease of explanation, the user-configurable resource arbitration mechanism is described as being used in the process control system 100 of FIG. 1. The user-configurable resource arbitration mechanism could be used in any other suitable device or system.

Figure 2A:
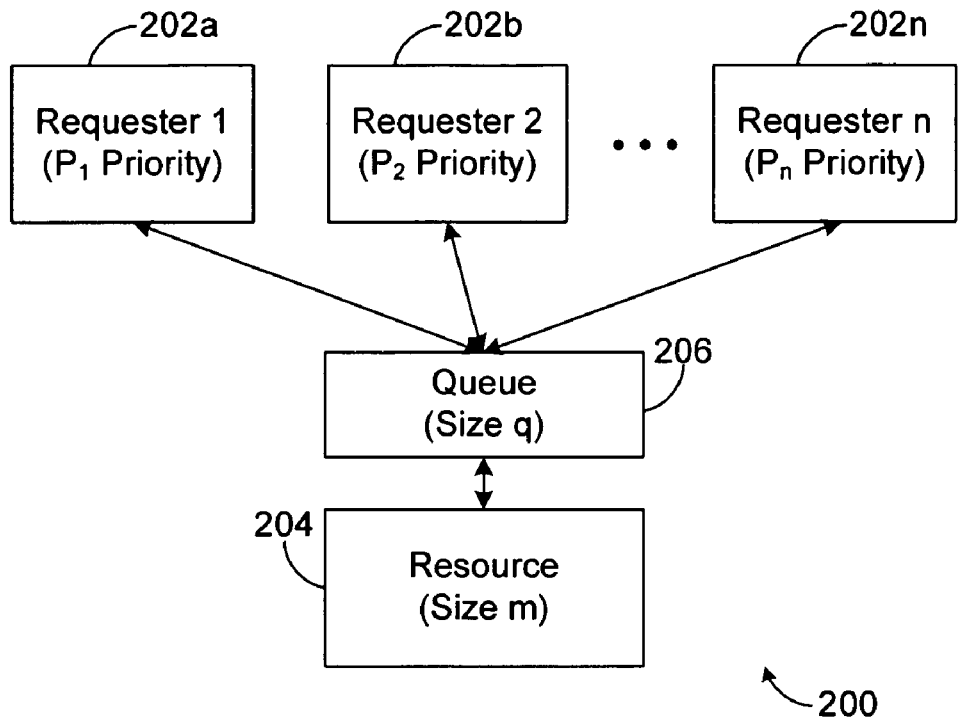
FIGS. 2A through 10 illustrate an example user-configurable resource arbitration mechanism in a process control system in accordance with this disclosure.
Figure 2B:
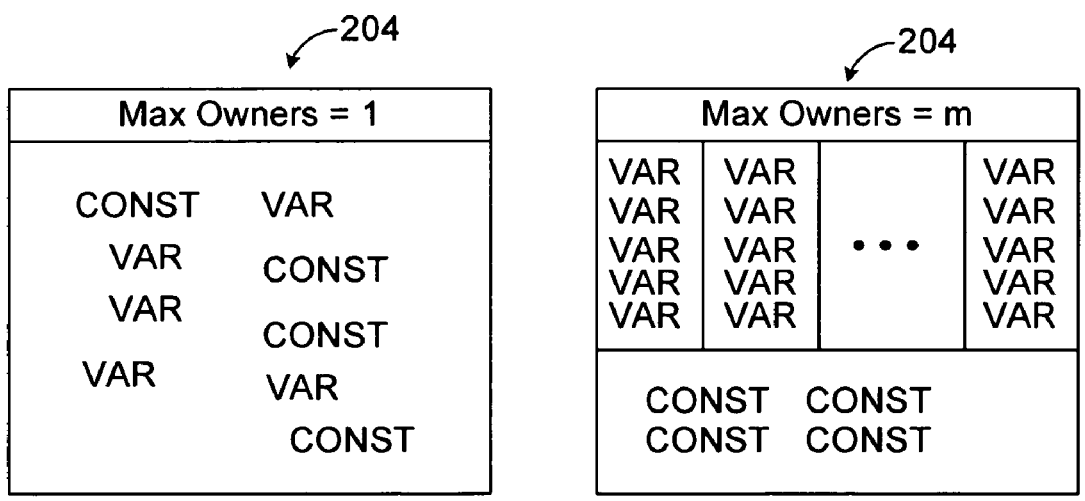

FIGS. 2A and 2B illustrate example resource arbitrations in a process control system. As shown in FIG. 2A, multiple requesters 202a-202n may attempt to acquire and use a resource 204. In some embodiments, the requesters 202a-202n are objects in the process control system 100 that have the capability to acquire and release one or more resources 204. The requesters 202a-202n could, for example, represent processes or portions thereof (such as sub-processes or tasks) that require the use of the resource 204 to produce a product. The number of requesters 202a-202n may be denoted n.

The resource 204 is an object that represents a process element or other real-world resource having the capability to be acquired and released by the requesters 202a-202n. The resource 204 may also have the capability to resolve or arbitrate conflicts between concurrent acquisition requests that exceed the capacity of the resource 204. This could occur, for example, if more requesters attempt to acquire the resource 204 than allowed. The number of requesters 202a-202n that can acquire and use a resource 204 concurrently may be denoted m (where $m \geq 1$). As shown in FIG. 2B, if a resource 204 can have a single owner, the resource 204 could include or be associated with memory space for storing constants and variables used by or on behalf of the single owner of the resource 204. If a resource 204 can have multiple owners, the resource 204 could include or be associated with memory space for storing constants and a separate memory space for storing variables used by or on behalf of each possible owner of the resource 204.

Optionally, a queue 206 can be provided to store acquisition requests from the requesters 202a-202n that exceed the capacity of the resource 204. The queue 206 could represent any suitable structure for holding unsatisfied acquisition requests, such as a first-in, first-out (FIFO) queue or a prioritized queue. A prioritized queue could operate based on priorities associated with the requesters 202a-202n, where at least two of the requesters 202a-202n have different priorities. The size of the queue 206 may be denoted q.

In some embodiments, resources 204 may be classified into different categories. For example, a resource 204 could be classified based on the number of requesters 202a-202n that can concurrently use the resource 204 and the presence or type of the queue 206. For example, a resource 204 may represent an "exclusive use" shared resource, which can be acquired and used by only one of the requesters 202a-202n at a time (typically the queue 206 is not provided). As another example, a resource 204 may represent a "non-exclusive use" shared resource, which can be acquired and used by multiple ones of the requesters 202a-202n at the same time (typically m<n and the queue 206 is not provided). In addition, a resource 204 could represent a "prioritized non-exclusive use" shared resource having a priority queue 206 (typically up to m requesters can use the resource 204 and up to q requesters can be queued based on the priorities). Other or additional categories of resources 204 could also be used.

For an "exclusive use" resource 204, the resource 204 may have an owner parameter, a request parameter, and a release parameter. The owner parameter identifies the requester that has acquired the resource 204. The request parameter is used by a requester to indicate that the requester wishes to acquire the resource 204. The release parameter is used by a requester to indicate that the requester wishes to release the resource 204 (which could be effective only if the requester owns the resource 204). A requester that needs the resource 204 may repeatedly attempt to acquire the resource 204, until either the resource 204 is acquired or a timeout or other condition occurs. When the resource 204 is acquired, the requester writes its identifier to the owner parameter of the resource 204. The resource 204 is used by that requester only, until the requester (or a user or maintenance or other tool) writes a value of "none" or a similar value to the owner parameter of the resource 204. At that point, the resource 204 is released and is free to be acquired by another resource.

For a "non-exclusive use" shared resource 204, the resource 204 may have an owners parameter, a request parameter, a release parameter, and an available parameter. The owners parameter identifies up to m requesters that have acquired the resource 204. The available parameter indicates whether the resource 204 can be acquired by at least one other requester, such as a Boolean parameter set to TRUE (available) if m<n and FALSE (unavailable) if m=n.

For a "prioritized non-exclusive use" shared resource 204, up to m requesters can acquire and use the resource 204 concurrently, and up to q additional requesters can have their acquisition requests queued in the queue 206. The resource 204 may have an owners parameter, a request parameter, a release parameter, an available parameter, and a prioritized queue (queue 206) with q entries identifying requesters and their associated priorities. New acquisition requests may be inserted into the queue 206 after the last entry with the same priority, pushing all entries with lower priorities back by one position. If $m+q \geq n$, none of the requesters may be forced to re-request the resource 204. If m+q<n, the last n−(m+q) requesters may have to re-request the resource 204 until their requests fit into the queue 206. Also, the addition of a higher priority request in the queue 206 may force out the acquisition request in the last entry of the queue 206. The requester that submitted this acquisition request could perform a periodic re-request while waiting for the resource 204, which may ultimately place the requester back into the queue 206.

In some embodiments, the requesters 202a-202n and the resource 204 represent objects in a control execution environment ("CEE"). An example control execution environment is disclosed in U.S. patent application Ser. No. 11/175,848 entitled "DETERMINISTIC RUNTIME EXECUTION ENVIRONMENT AND METHOD", which is hereby incorporated by reference. In particular embodiments, each of the requesters 202a-202n contains an object of a particular class (such as a clsRequester class), and each resource 204 contains an object of a different class (such as a clsResource class). The classes clsRequester and clsResource could be derived from the same global class (such as a clsGlobalRoot class) to simplify implementation of get and store codes or other code.

The user-configurable resource arbitration mechanism supported in the process control system 100 may allow the requesters 202a-202n to acquire and release the resource 204 in a manner compliant with a user's arbitration strategies. For example, the user may define which of the above strategies (exclusive use, non-exclusive use, prioritized non-exclusive use, or other) is used for a particular resource 204. The user could also define the parameters of the requesters 202a-202n and the resources 204, such as the priority of a requester or the queue size of a resource. In this way, the user can control if and how resource arbitration occurs in the process control system 100.

In some embodiments, a requester may enter into an ACQUIRING state when the requester has attempted to acquire a resource 204 and been placed into the queue 206. A requester in the ACQUIRING state may periodically or repeatedly check on the status of its acquisition request. To balance network load, central processing unit (CPU) use and response time can be used to determine how often a status request is repeated. For example, a request may generally be repeated less frequently (with a slower background period). Requests may be repeated immediately if the status of a resource 204 changes from "unavailable" to "available" or the priority of the requester has been changed. In particular embodiments, the determination of whether to re-request a resource 204 is made after state processing, which helps to ensure that the state processing has not moved the requester out of the ACQUIRING state. Also, the background period may or may not be adjustable by a user. If not, the background period could, for example, represent a tuning factor in the code. One possible fixed background period could equal twenty times the amount of time granted to execute a function block. As a result of this, an indefinite number of requesters can be managed with a queue 206 of limited size or even without a queue 206. The queue's size may not impact the ability to acquire a resource 204 or impact any configuration on the requester side. The queue 206 may help in recovery scenarios and make the behavior of the system more transparent to a user at an operator station.

In particular embodiments, if a requester attempts to acquire a resource 204 while owning that resource 204 or while in the queue 206 for that resource 204, nothing may occur (equivalent to a "no-operation"). Similarly, if a requester attempts to release a resource 204 while not owning that resource 204, nothing may occur. A requester may request the same resource 204 multiple times but release it only once, or the requester could request a resource 204 once and release it multiple times. This is opposed to conventional semaphores, where the number of requests has to match the number of releases. If a request from a requester is repeated with a different priority while the requester is still listed in the queue 206, the priority of the existing request may be updated and the queue 206 resorted.

Figure 3:
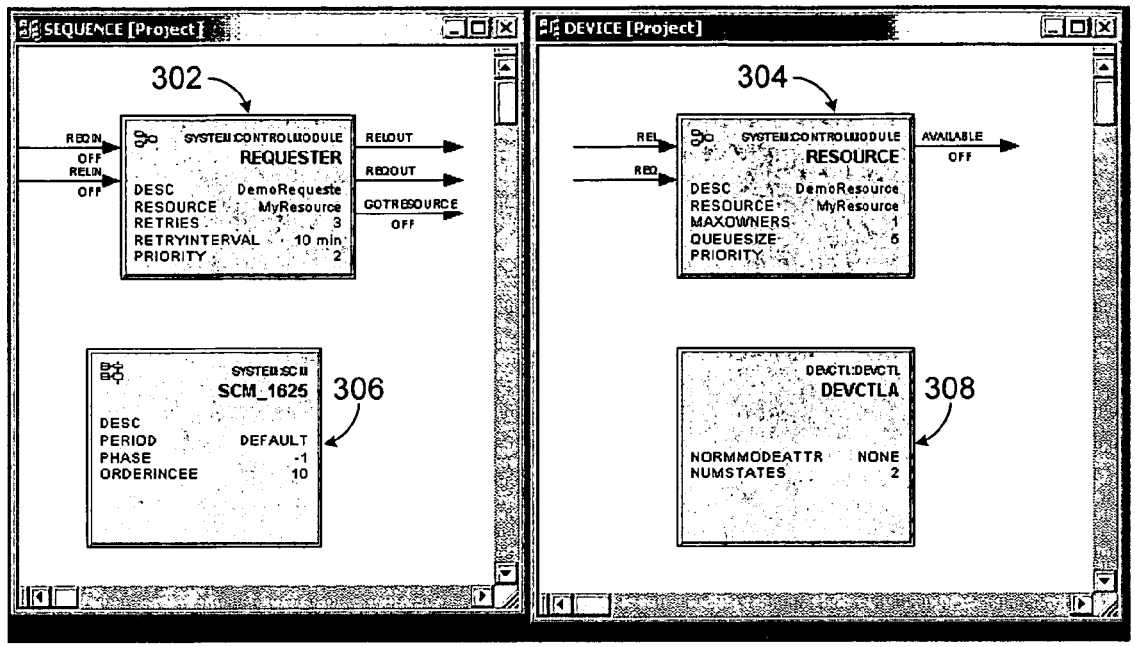

FIG. 3 illustrates example function blocks supporting a user-configurable resource arbitration mechanism. In some embodiments, the process control system 100 supports the use of function blocks. Function blocks represent executable software objects that perform specific tasks. A user (such as a control or process engineer) may select and link particular function blocks in a graphical tool to define a control process. One or more of the controllers 104a-104b can then implement the defined control process using the selected function blocks.

In these embodiments, the requesters 202a-202n and resources 204 can be implemented using function blocks. For example, as shown in FIG. 3, a requester function block 302 represents a requester, and a resource function block 304 represents a resource. A user can create various function blocks 302-304 and define the parameters of the function blocks 302-304 (such as the parameters discussed above) and the inputs and outputs of those function blocks 302-304. The user could also add, modify, or delete the parameters, inputs, and outputs of the function blocks 302-304. In this way, users can create function blocks 302-304 representing a wide variety of requesters and resources.

For the requester function block 302, a description parameter (DESC) provides a textual descriptor for the function block 302, and a resource parameter (RESOURCE) identifies the current resource acquired by the requester function block 302 (if any). A retries parameter (RETRIES) identifies the number of times that the requester function block 302 attempts to acquire a resource before a timeout or other error occurs. An interval parameter (RETRYINTERVAL) identifies the period between resource acquisition attempts. In particular embodiments, however, the requester function block 302 may automatically suppress repeat arbitration requests until there is a probability greater than zero of acquiring a resource, which helps to avoid useless traffic in the process control system 100. A priority parameter (PRIORITY) identifies a priority for the requester. In addition, the requester function block 302 can include request and release inputs (REQIN and RELIN) and request, release, and "got resource" outputs (REQOUT, RELOUT, and GOTRESOURCE). The "got resource" output may be used to indicate whether the requester function block 302 has successfully acquired a resource. Various parameters of the requester function block 302 can be omitted if desired, and various inputs and outputs of the requester function block 302 can be activated or deactivated according to the user's particular needs.

For the resource function block 304, a description parameter (DESC) provides a textual descriptor for the function block 304, and a resource parameter (RESOURCE) identifies the name of the resource represented by the function block 304. A maximum owners parameter (MAXOWNERS) defines the largest number of requesters that can acquire and use the resource at any given time. A size parameter (QUEUESIZE) identifies the number of entries in a queue 206 associated with a resource 204 (if any). A priority parameter (PRIORITY) identifies a priority for the resource. In addition, the resource function block 304 can include request and release inputs (REQ and REL) and an available output (AVAILABLE).

Figure 4:
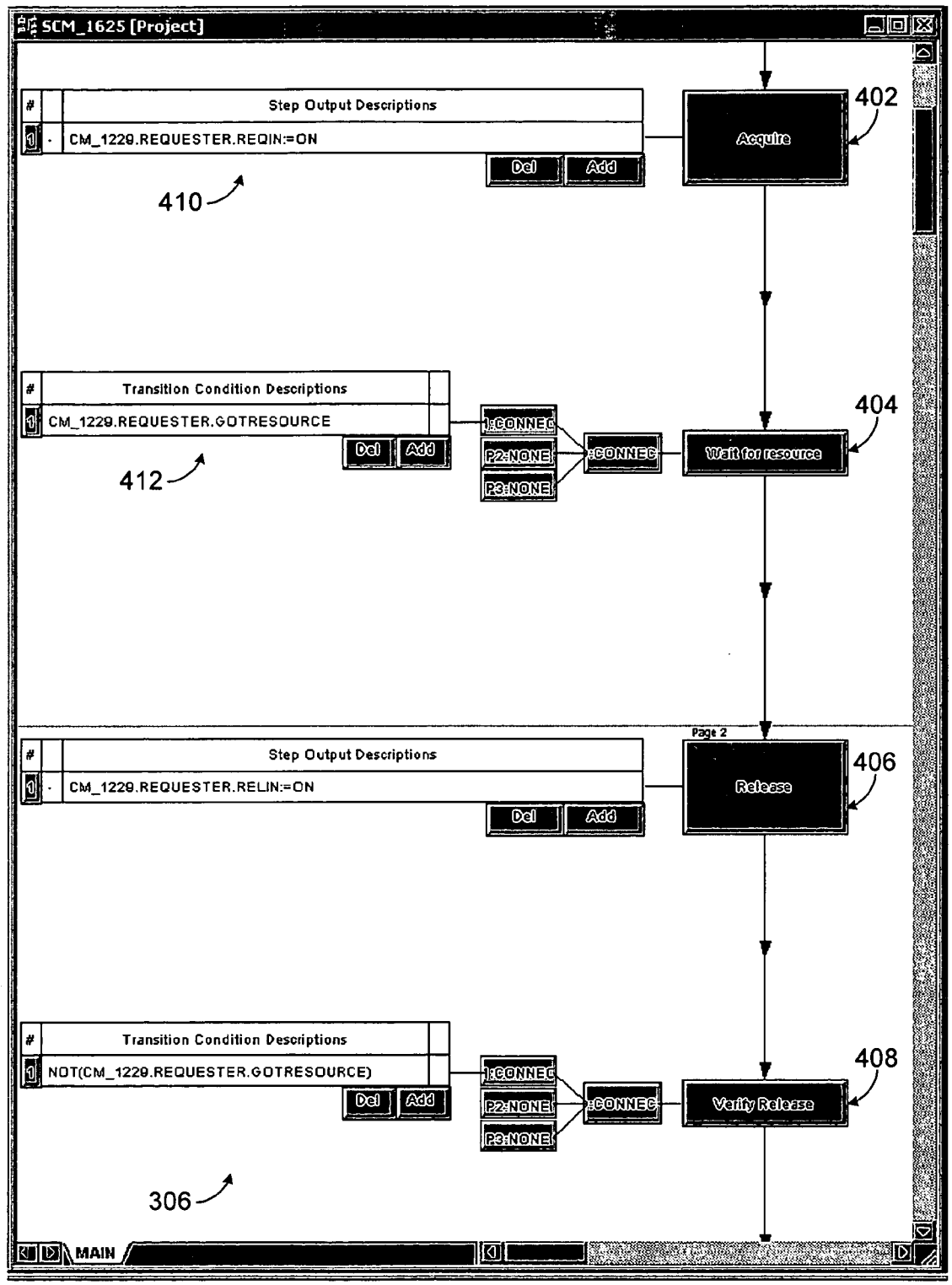

Once defined, a requester function block 302 can acquire and release resource function blocks 304. The requester function block 302 could be used in a stand-alone manner or be called from or used in other function blocks, such as function block 306. One example of the function block 306 is shown in FIG. 4. In this example, the function block 306 includes a step 402 and a transition 404, which invoke the resource acquisition functionality of the requester function block 302, allowing the function block 306 to acquire a resource. The function block 306 also includes a step 406 and a transition 408, which invoke the resource release functionality of the function block 302, allowing the function block 306 to release a resource. The steps 402 and 406 represent functions performed by the function block 306, such as causing the requester function block 302 to output a particular value. The transitions 404 and 408 verify that one or more conditions have been met before proceeding to the next step. Each step 402 and 406 is associated with a step definition section 410, which allows the user to define the function(s) performed during the step. Each transition 404 and 408 is associated with a transition definition section 412, which allows the user to define the condition(s) to be met before proceeding to the next step.

By defining the appropriate steps and transitions or by otherwise incorporating the functionality of the requester function block 302, the function block 306 can acquire and release a resource as needed. Moreover, multiple function blocks 306 could invoke the requester function block 302, which allows different processes or sub-processes to acquire and use a resource.

As shown in FIG. 3, the resource function block 304 is associated with a function block 308. The function block 308 identifies an actual real-world resource, such as a process element. The function block 308 can be defined by the user to identify a particular resource in the process control system 100, as well as to define various characteristics of the resource (such as the number of states in which the resource can operate). A resource function block 304 can be associated with the function block 308 to facilitate acquisition and release of the resource represented by the function block 308.

By controlling the definition of the function blocks 302, the user can control how requesters attempt to acquire and release resources in the process control system 100. By controlling the definition of the function blocks 304, the user can control how resources in the process control system 100 handle acquisition and release requests from requesters attempting to acquire the resources. The requester function blocks 302 can then be used to acquire and release resource function blocks 304 to support a process in the process control system 100.

In particular embodiments, a requester function block 302 can query a resource function block 304 at any time, whether or not the requester function block 302 owns the resource function block 304. For example, a requester function block 302 could query whether it can acquire a resource function block 304 at any time, without actually acquiring or attempting to acquire the resource function block 304. Also, if a requester function block 302 attempts to acquire a resource function block 304 that it already owns or to release a function block 304 it already released, no change could occur. In addition, if a requester function block 302 has acquired a resource function block 304, the resource function block 304 may not be forcibly taken from the requester function block 302 (except by users or maintenance or other tools, such as a tool that frees resource function blocks 304 owned by terminated requester function blocks 302).

Moreover, various deadlock prevention strategies could be used to prevent requester function blocks 302 from acquiring resource function blocks 304 in a manner that prevents each of the requester function blocks 302 from completing its operations. For example, a requester function block 302 could be required to acquire all necessary resource function blocks 304 before beginning execution. Also, a requester function block 302 could be prevented from acquiring resource function blocks 304 having a lower priority, or the requester function block 302 could provide a warning when this occurs. In addition, the priorities assigned to the requester function blocks 302 could be used to control acquisition and release of the resource function blocks 304.

In particular embodiments, one or more connections are configured between a requester function block 302 and a resource function block 304 and used to transport request and release information between the function blocks 302 and 304. A connection could, for example, represent a push connection initially created by the requester function block 302. A hidden connection could also be created from the resource function block 304 back to the requester function block 302, which is used by the resource function block 304 to identify all potential users of the resource function block 304. If the requester function blocks 302 and the resource function blocks 304 are distributed across a single network, they could communicate using any suitable technique, such as peer-to-peer communications that involve two structure connections (one each way). If the requester function blocks 302 and the resource function blocks 304 are distributed across multiple networks, requester function blocks 302 could act as proxies to the resource function blocks 304, where a particular requester function block 302-resource function block 304 pair allows a particular user to acquire a particular resource function block 304.

Figure 5:
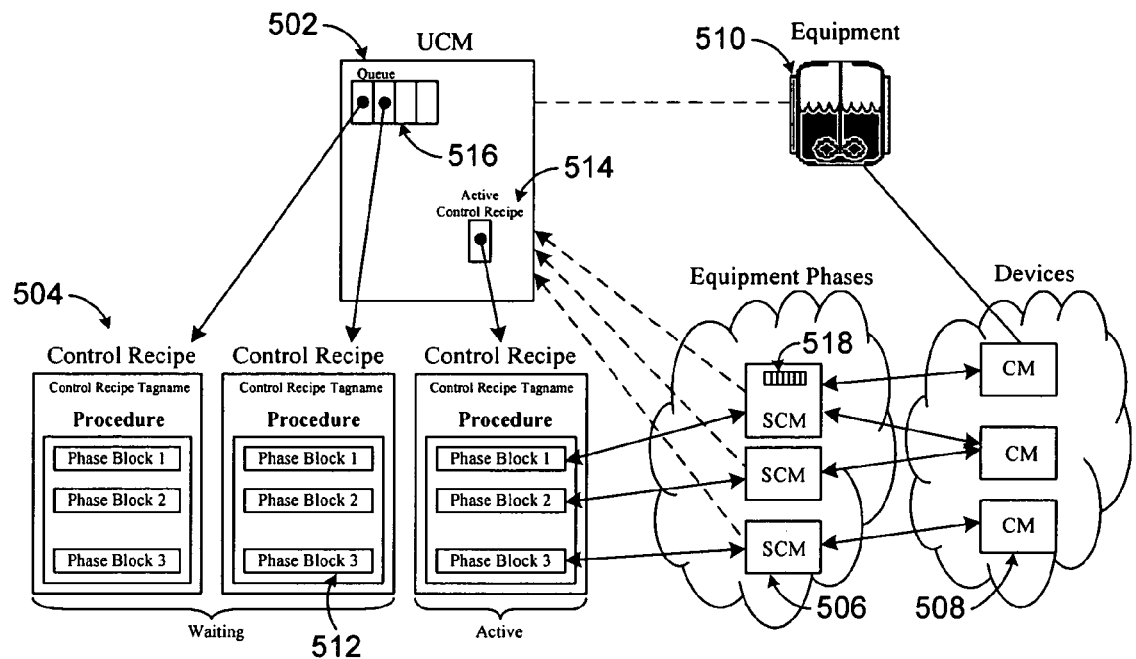

FIG. 5 illustrates examples of how the requester function blocks 302 and the resource function blocks 304 could be used to support a production process in a process control system 100. As shown in FIG. 3, requester function blocks 302 and resource function blocks 304 could be implemented as stand-alone function blocks. As shown in FIG. 5, requester function blocks 302 and resource function blocks 304 could also be incorporated as parameters into unit control modules (UCMs) 502, recipe control modules (RCMs) 504, sequential control modules (SCMs) 506, or control modules (CMs) 508. In some embodiments, the unit control modules 502, recipe control modules 504, sequential control modules 506, and control modules 508 are distributed across multiple components in the process control system 100, such as the controllers 104*a*-104*b*. In particular embodiments, an option could be provided to prevent individual control modules from defining a requester function block 302 or a resource function block 304, which could reduce the memory needed by those control modules.

A unit control module 502 generally represents a piece of processing equipment 510, where use of the processing equipment 510 occurs after acquisition of the unit control module 502. A recipe control module 504 represents information defining the production requirements for a specific product, where execution of a recipe control module 504 could result in the production of a single batch of the product. A recipe control module 504 could include a header, a procedure, a formula, and any equipment requirements. The procedure in a recipe control module 504 is defined by a set of phases represented by phase function blocks 512. Each phase of a recipe control module 504 is associated with a sequential control module 506, which interacts with one or more control modules 508 to implement one of the phases of the recipe control module 504. The control modules 508 provide access to and control over the actual piece of processing equipment 510.

A recipe control module 504 manipulates the sequential control modules 506 through its phases, where the phases control the sequential control modules 506, monitor the execution states of the sequential control modules 506, and optionally propagate the execution states to the recipe control module 504. The sequential control modules 506 may monitor their parent recipe control modules' states through the phases and take suitable actions when the recipe control modules 504 enter abnormal states. In particular embodiments, the various control modules 504-508 could operate as defined by the International Electrotechnical Commission (IEC) 61131 standard or in U.S. Pat. No. 6,317,638 (both of which are hereby incorporated by reference).

When a recipe control module 504 is created, it may be assigned to a specific unit control module 502, which is acquired when the recipe control module 504 is executed and released when the recipe control module 504 reaches a terminal state. Various parameters can be defined when a recipe control module 504 is created. These may include a reference to a sequential control module 506 for execution control, a resource name to be allocated when a phase is started, and a flag indicating if the acquired resource will be released at the end of the execution of a sequential control module 506. By default, the resource name may be based on the selected sequential control module's name. If there is no selected sequential control module 506, a phase can be used for resource management purposes. Once in a terminal state, all resources acquired by the recipe control module 504 may or may not be released depending on the configuration flag.

In FIG. 5, by incorporating one or more requester function blocks 302 and/or resource function blocks 304 into various control modules, a particular control module can act as a requester and acquire the resources it needs to complete. For example, the unit control modules 502, sequential control modules 506, and control modules 508 may represent common resources that can be shared between multiple requesters (such as multiple recipe control modules 504). As a particular example, a recipe control module 504 may generally need to acquire a unit control module 502 to execute its procedure. The recipe control module 504 could include a requester function block 302, and the unit control module 502 could include a resource function block 304. This would allow the recipe control module 504 to acquire and release the unit control module 502. As another particular example, incorporating resource function blocks 304 into the sequential control modules 506 and the control modules 508 would allow a recipe control module 504 to acquire the sequential control modules 506 and the control modules 508 it needs in order to implement the production of a product.

An active control recipe pointer 514 in the unit control module 502 identifies the recipe control module 504 currently being executed (the recipe control module 504 that currently owns the unit control module 502). An arbitration queue 516 identifies a specified number of recipe control modules 504 waiting to be executed by the unit control module 502 (one or more recipe control modules 504 waiting to acquire the unit control module 502). When the current recipe control module 504 releases the unit control module 502, the unit control module 502 can select the next recipe control module 504 from the queue 516 using any suitable arbitration technique supported by the unit control module 502 or defined by the user (such as FIFO). In particular embodiments, the active control recipe pointer 514 and the arbitration queue 516 store tagnames or other identifiers of the recipe control modules 504. Similarly, the sequential control module 506 may include an arbitration queue 518. One or more phases that are waiting to acquire the sequential control module 506 may be identified in the arbitration queue 518, and the phases can be retrieved from the queue 518 in any suitable order (such as FIFO).

Table 1 identifies the elements of FIG. 5 that can incorporate or use the requester and resource function blocks 302-304, as well as the number of requester and resource function blocks 302-304 those elements can incorporate or use in a particular embodiment.

TABLE 1

|  | RCM | UCM | SCM | CM | PHASE FUNCTION BLOCK |
|---|---|---|---|---|---|
| REQUESTER | $\geq 0$ | 0 | 0 or 1 | 0 | 1 |
| RESOURCE | 0 or 1 | 1 | 0 or 1 | 0 or 1 | 0 |

If a requester function block 302 is contained in a phase function block 512, the requester function block 302 could use an identifier associated with the phase's recipe control module 504 to request a resource (such as a sequential control module 506). This means the identifier of the recipe control module 504 would appear in the arbitration queue 518 of a sequential control module 506. The phase function block 512 typically uses the requester function block 302 to acquire sequential control modules 506 and control modules 508. If a requester function block 302 is contained in a recipe control module 504, the requester function block 302 could use the identifier associated with the recipe control module 504 to request a resource. This means the identifier of the recipe control module 504 would appear in the arbitration queue 516 of a unit control module 502. The recipe control module 504 typically uses the requester function block 302 to acquire unit control modules 502. In addition, a requester function block 302 could use its own identifier to acquire any suitable resource. The identifiers could represent any suitable values, such as INT32 values that allow unique identification within a cluster in the process control system 100.

In some embodiments, four connections may be used between a unit control module 502 and a recipe control module 504. Table 2 identifies these connections.

TABLE 2

| Connection Name | Conn. Type | Owner | Parameter Name on Active Side of Connection | Parameter Name on Passive Side of Connection | Creation Time | Binding Time |
|---|---|---|---|---|---|---|
| Arb. Request | Store | RCM | CMDREQOUT (RCM) | CMDREQIN (UCM) | Load Time | Load Time |
| Arb. Status | Get | RCM | OWNERS (RCM) | OWNERS (UCM) | Load Time | Load Time |
| RCM Monitoring Source | Get | UCM | RCMMonSrc (UCM) | RCMMonitor (RCM) | Run Time | Run Time |
| RCM Command | Store | UCM | RCMCommand (UCM) | Command (RCM) | Run Time | Run Time |

The arbitration request connection represents a store connection owned and used by a recipe control module 504 to send an arbitration request to its associated unit control module 502. The arbitration status connection represents a get connection owned and used by the recipe control module 504 to read the arbitration status from the unit control module 502. These two connections may be created and bound at load time or run time. In particular embodiments, a recipe control module 504 is associated with a fixed unit control module 502 and the relationship is determined at configuration time, so it is possible to create and bind these connections when the recipe control module 504 is loaded.

In particular embodiments, the recipe control modules 504 can arbitrate for the unit control modules 502 and the sequential control modules 506. Also, the sequential control modules 506 can arbitrate for the control modules 508.

For an "exclusive use" unit control module 502, only one recipe control module 504 can acquire and use the unit control module 502 at any given time. In some embodiments, a recipe control module 504 can acquire only one specific unit control module 502. More than one recipe control module 504 may request the same unit control module 502, but only one can acquire and use the unit control module 502 at a time. The recipe control module 504 that currently owns the unit control module 502 is identified by the active control recipe pointer 514, and one or more recipe control modules 504 that have requested the unit control module 502 are identified in the arbitration queue 516.

To acquire the unit control module 502, a recipe control module 504 may send an arbitration request to the unit control module 502. The request may contain the tagname and a batch identifier of the recipe control module 504. The batch identifier identifies a batch of material(s) produced or used by or during a process. The recipe control module 504 may periodically query the unit control module 502 for the status of the arbitration request.

When the unit control module 502 receives an arbitration request from a recipe control module 504, the unit control module 502 places the arbitration request in the active control recipe pointer 514 or the arbitration queue 516. If placed in the arbitration queue 516, the tagname of the recipe control module 504 may be placed in the appropriate slot of the arbitration queue 516, and an ACQUIRING status is returned to the recipe control module 504. Tagnames may be retrieved from the arbitration queue 516 and placed in the active control recipe pointer 514 as the unit control module 502 is acquired and released by various recipe control modules 502.

When the unit control module 502 is acquired by a recipe control module 504, the unit control module 502 monitors the recipe control module 504 and identifies the state, mode, and active step of the recipe control module 504. In particular embodiments, the unit control module 502 may fetch the state, mode, and active step of the recipe control module 504 every execution cycle.

When execution of the current recipe control module 504 is completed, the recipe control module 504 may generate a RELEASE RESOURCE request for the unit control module 502. When the unit control module 502 receives the request, the unit control module 502 removes the recipe control module 504 from the active control recipe pointer 514 and returns a NONE status to the recipe control module 504. Meanwhile, the unit control module 502 may take the recipe control module 504 at the top of the arbitration queue 516 and place it in the active control recipe pointer 514. The unit control module 502 also informs the recipe control module 504 that has just been placed in the active control recipe pointer 514 that it has acquired the unit control module 502, such as by sending an OK status to that recipe control module 504. The unit control module 502 may also move any remaining recipe control modules 504 in the arbitration queue 516 up by one position.

Figure 8:
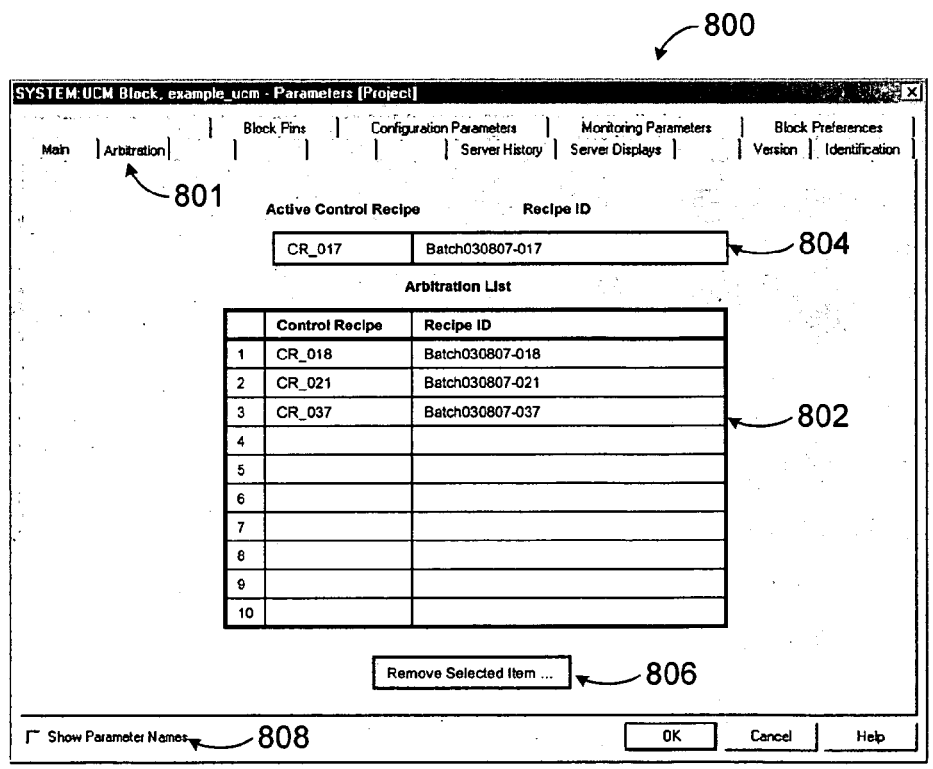

An operator or a program can cancel an arbitration request when the recipe control module 504 is in the ACQUIRING state (listed in the arbitration queue 516). For example, the unit control module 502 may include a parameter named CANCELREQ. An operator or program can store the tagname of a recipe control module 504 in the CANCELREQ parameter, which requests that the unit control module 502 remove the identified recipe control module 504 from the arbitration queue 516. An operator can also cancel an arbitration request from the arbitration queue 516 using a graphical user interface associated with the unit control module 502, as example of which is shown in FIG. 8 and described below. This also results in a selected recipe control module 504 being identified in the CANCELREQ parameter. The unit control module 502 may periodically check the CANCELREQ parameter, take any recipe control module 504 tagname from the CANCELREQ parameter, and match it in the arbitration queue 516. If the unit control module 502 finds a match, the unit control module 502 may remove the recipe control module 504 from the queue 516 and return a NONE status to the recipe control module 504. In particular embodiments, the operator or program may be unable to cancel an arbitration request if the recipe control module 504 has already acquired the unit control module 502 and is running (cancellation in this case may require other tools).

For an "exclusive use" sequential control module 506, a recipe control module 504 can acquire the sequential control module 506. In some embodiments, a phase can only acquire the sequential control module 506 that is linked to that phase (such as the sequential control module 506 specified by an "SCM Designation" parameter in the phase). More than one phase may request a single sequential control module 506 if the sequential control module 506 is a shared resource (which could be specified by the unit control module 502 having the appropriate option set to "Exclusive-use common"), but only one phase can acquire and use the sequential control module 506 at a time. The phase that currently owns a sequential control module 506 is called an "Active Phase," which may be identified by an APHASE parameter in the sequential control module 506. Similar to the unit control module 502, the sequential control module 506 manages an arbitration queue 518, which identifies one or more phases that are waiting in the queue to acquire the sequential control module 506.

The sequential control module 506 may process arbitration requests in the same or similar manner as the unit control module 502. In addition, in arbitration requests received by the sequential control module 506, a phase may identify the name of the unit control module 502 associated with the phase's parent recipe control module 504. This allows the sequential control module 506 to make a connection to the unit control module 502. When a phase acquires the sequential control module 506, the sequential control module 506 places the parent unit control module 502 of the phase in a UCMNAME parameter and makes a connection to the unit control module 502. At run time, the sequential control module 506 fetches the status of the phase's recipe control module 504 from the unit control module 502.

The arbitration queue 518 may have a status field for each of the arbitration requests in the queue 518. In some embodiments, all of the requests in the queue 518 can be monitored, and the status of each request can be updated. For example, if a requester (such as a recipe control module 504) and the sequential control module 506 are distributed (such as in different controllers) and the controller that has the recipe control module 504 is down, communication between the recipe control module 504 and the sequential control module 506 is lost or broken. If the sequential control module 506 does not receive any communications from the recipe control module 504 (such as for a specified time), the status of the arbitration request from that recipe control module 504 could be set to "bad," and a resource is not assigned to the request. If communication later resumes, the status of the request may be set to "OK," and the request is processed further.

For a dedicated sequential control module 506 (one that is dedicated to use by only one recipe control module 504), a recipe control module 504 may acquire the sequential control module 506 before controlling it, even though the sequential control module 506 is dedicated to that recipe control module 504. As with the shared sequential control module 506, multiple phases may attempt to acquire the same dedicated sequential control module 506 (which could happen, for example, with parallel phase execution), but only one phase can acquire and use the sequential control module 506 at a time. The phase that currently owns the sequential control module 506 is identified in the APHASE parameter of the sequential control module 506. A dedicated sequential control module 506 may also manage an arbitration queue 518, which identifies one or more phases that are waiting for the sequential control module 506.

In particular embodiments, if a sequential control module 506 needs a resource in a different network (such as via a peer-to-peer backbone network), two or three Boolean connections may be used between the sequential control module 506 and the resource. These may include a connection for an acquisition request, a connection for a release request, and a connection for the GotResource signal. Also, if a recipe control module 504 in one network needs a sequential control module 506 in a different network, the phase function block 512 in the recipe control module 504 may be unable to control sequential control module 506 directly. Rather, a proxy sequential control module 506 could be provided in the same network as the phase function block 512. The phase function block 512 may control the proxy sequential control module 506, and the proxy sequential control module 506 may control the sequential control module 506 in the other network. In addition, a recipe control module 504 could contain an array of requester function blocks 302, where the size of the array equals the maximum number of resources required by the recipe control module 504. If the same sequential control module 506 is required by multiple phases of the recipe control module 504, a single requester could be used in the array. A phase function block 512 could only specify a needed resource by name, and the recipe control module 504 uses the appropriate requester to acquire or release the resource. Multiple phase function blocks 512 could command or otherwise use the same sequential control module 506.

In some embodiments, a resource (such as a sequential control module 506) may or may not be required to reach a terminal state (such as a completed, aborted, or terminal stopped state) before a phase in a recipe control module 504 is completed. For example, Table 3 illustrates different possible configurations or operations of a resource and a recipe control module 504.

TABLE 3

| Release Resource After Use | Wait for Terminal State | Remarks |
|---|---|---|
| No | No | Resource left running and kept acquired by phase |
| No | Yes | Resource reused by phase |
| Yes | No | Resource left running and released by phase |
| Yes | Yes | Resource no longer running and released by phase upon phase completion |

In particular embodiments, a phase reports various history parameters upon completion, such as parameters related to its use of the resource. If the resource does not need to reach a terminal state before a phase completes, reporting of the history parameters could be skipped, or the history parameters could be reported as soon as an SCM Start command is issued.

Table 4 illustrates possible resource arbitration scenarios in the process control system 100.

TABLE 4

| Requester | Resource | Remarks |
|---|---|---|
| RCM containing phase block with built-in requester | SCM containing built-in resource | Phase step acquires and uses SCM |
| RCM containing phase block with built-in requester | CM containing built-in resource | Phase step (not executing an SCM, but storing parameters to other destinations) acquires CM |
| RCM containing phase block with built-in requester | CM containing built-in resource | |
| CM containing requester function block | CM containing built-in resource | Allows CM to CM resource arbitration (for development and testing) |
| SCM containing requester function block | CM containing built-in resource | May require CM functionality for SCM (could use containment) |
| SCM having step that references a requester function block | CM containing built-in resource | Allows for SCM to CM resource arbitration |
| RCM containing built-in requester | UCM containing built-in resource | Unit acquisition |
| RCM containing built-in requester | RCM containing built-in resource | Recipe nesting |

Table 5 illustrates possible resource acquisition scenarios involving the phase function blocks in the recipe control modules 504.

TABLE 5

| Scenario | Acquire Resource | Execute | Release Resource at End of Phase |
|---|---|---|---|
| Classic Phase | SCM | SCM | Yes |
| Null-Phase | None | None | N/A |
| Allocate SCM | SCM | None | No |
| Allocate other | CM | None | No |
| Conti-Phase | SCM | SCM | No |
| Allocated | None | SCM | Yes or No |
| Release | CM/SCM | None | Yes |

Table 6 illustrates the functional power of the phase function block results from the free and mostly independent combination of its major sub-functions.

TABLE 6

| Name | Acquire Resource before Execution | Execute on the Resource | Wait for Terminal State | Release Resource after Execution | Remark |
|---|---|---|---|---|---|
| None | No | No | No | No | NULL-step |
| None | x | x | x | Yes | Error (not possible) |
| None | No | No | Yes | No | Info (ignored) |
| None | x | Yes | x | x | Error (not possible) |
| None | Yes | x | x | x | Error (not possible) |
| SCM/ | No | No | No | No | Info (Equipment |

TABLE 6-continued

| Name | Acquire Resource before Execution | Execute on the Resource | Wait for Terminal State | Release Resource after Execution | Remark |
|---|---|---|---|---|---|
| RCM | | | | | ignored) |
| SCM/RCM | No | YES | x | x | Warn (recipe may get blocked); Hint: Acquire = Yes avoids this |
| SCM/RCM | No | No | YES | x | Info (recipe may get blocked) |
| SCM/RCM | Yes | No | No | No | OK, only acquire resource |
| SCM/RCM | No | No | No | Yes | OK, only release resource |
| SCM/RCM | Yes | No | No | Yes | Warn (SCM configured but not executed) |
| SCM/RCM | Yes | No | Yes | x | Info (recipe may get blocked) |
| SCM/RCM | Yes | Yes | No | No | OK, leave running and acquired |
| SCM/RCM | Yes | Yes | No | Yes | OK, leave running after release |
| SCM/RCM | Yes | Yes | Yes | No | OK, keep acquired |
| SCM/RCM | Yes | Yes | Yes | Yes | Default; general purpose SCM control and execution; recipe nesting |
| UCM | Yes | No | No | x | OK, Acquire |
| UCM | x | No | No | Yes | OK, Release |
| UCM | x | Yes | x | x | Error (not possible) |
| UCM | x | x | Yes | x | Info (will be ignored) |
| CM.ResFB | Yes | No | No | x | OK, Acquire |
| CM.ResFB | x | No | No | Yes | OK, Release |
| CM.ResFB | x | Yes | x | x | Error (not possible) |
| CM.ResFB | x | x | Yes | x | Info (will be ignored) |

Here, a value of "x" in a table entry means it does not matter what the value is in that entry, and the value "CM.ResFB" refers to a control module 508 incorporating a resource function block 304. Also, if multiple lines apply, the line with the worst status could take precedence.

The above description has described several resource arbitration techniques that could be used with the various requesters and resources incorporated into the control modules 502-508 in FIG. 5. This has been for illustration and explanation only. Other or additional resource arbitration techniques could be used with the various requesters and resources incorporated into the control modules 502-508 in FIG. 5.

Figure 6A:
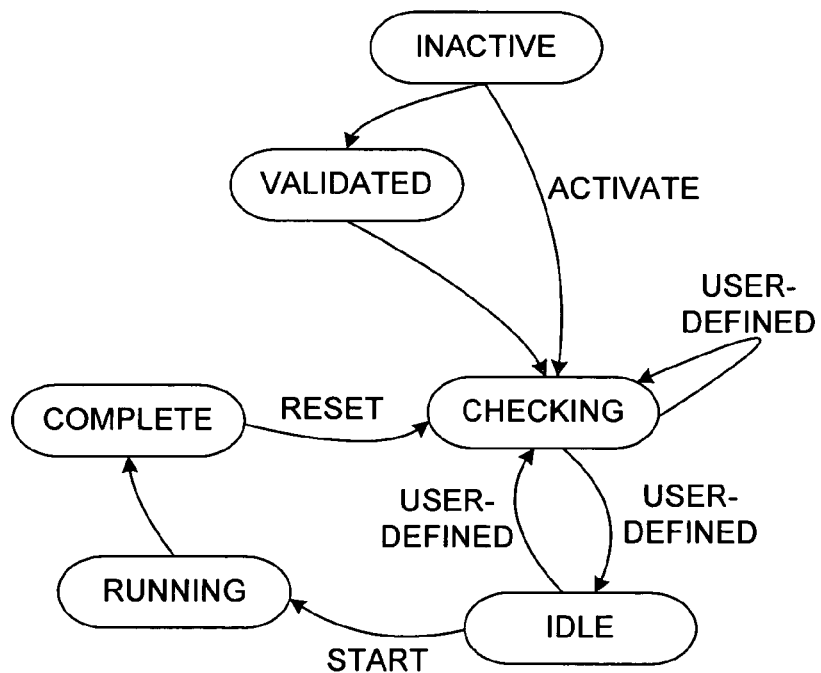
Figure 6B:
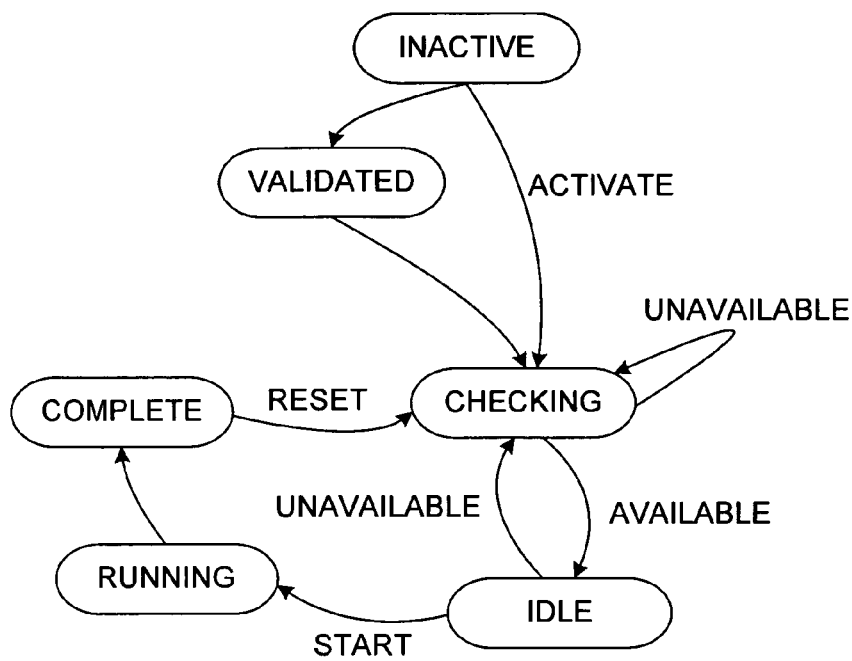
Figure 6C:
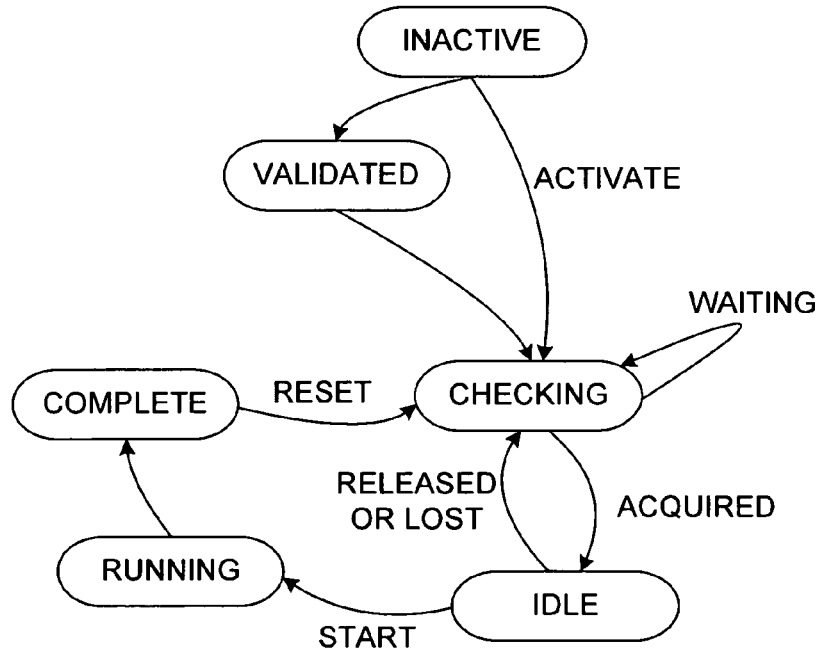

FIGS. 6A through 6C illustrate different models for acquiring and releasing resources (such as resources used by a recipe control module 504). These models are for illustration only. Other models for acquiring and releasing resources could also be used.

As shown in FIG. 6A, a recipe control module 504 may be in an Inactive state until activated by a user or program. The recipe control module 504 may then directly enter a Checking state or enter the Checking state after being validated in a Validated state. The Checking state implements any user-defined actions. These user-defined actions are performed to satisfy any user requirements before the recipe control module 504 is executed. Examples of user-defined actions may be found in U.S. Pat. No. 6,317,638 and could include resource acquisition functions.

After the Checking state, the recipe control module 504 may enter an Idle state. Once in the Idle state, the recipe control module 504 may wait for a "Start" command from the user or program. Once received, the recipe control module 504 enters a Running state, where the recipe control module 504 attempts to execute and complete its phases, and possibly acquire and release resources. After that, the recipe control module 504 enters a Complete state, where the recipe control module 504 may remain until reset by the user or program. At that point, the recipe control module 504 returns to the Checking state.

FIGS. 6B and 6C illustrate specific examples of the process shown in FIG. 6A. As shown in FIG. 6B, once in the Checking state, the process control system 100 tests whether the resources 204 needed by the recipe control module 504 are available (without actually acquiring the resources). If not, the recipe control module 504 remains in the Checking state. If and when the resources 204 are available, the recipe control module 504 enters the Idle state, and the recipe control module 504 remains in the Idle state until started or until one or more resources 204 become unavailable. The test for available resources 204 could occur at any suitable level. Also, more important tests (such as determining if critical sequential control modules 506 are available) could occur before other less critical tests.

As shown in FIG. 6C, once in the Checking state, the process control system 100 waits until all resources 204 needed by the recipe control module 504 are acquired before entering the Idle state. Once there, the recipe control module 504 remains in the Idle state until started or until one or more resources 204 are released or lost.

As noted above, once in the Running state, a recipe control module 504 may use and possibly acquire and release resources (such as a unit control module 502 or a sequential control module 506). In some embodiments, a resource may be released automatically upon completion of the execution of a recipe control module 504 or a phase. In particular embodiments, an abnormal termination may not cause automatic release of resources. Rather, a recipe control module 504 may hold onto a resource until the recipe control module 504 is actually terminated. For example, upon an abnormal termination of a sequential control module 506, a phase block 512 could perform all of the necessary clean-up operations except for the release of the sequential control module 506. The sequential control module 506 may be held until the phase block 512 completes or the recipe control module 504 is terminated. A user could also delete a recipe control module 504, causing the current active phase block(s) 512 to release any resources and causing the recipe control module 504 to release the unit control module 502. A re-loading of a unit control module 502 or a sequential control module 506 may wipe out its arbitration queue 516 or 518, while inactivation and reactivation of a unit control module 502 or a sequential control module 506 may not affect its arbitration queue 516 or 518.

FIGS. 7A through 7D illustrate possible distributions of recipe control modules 504 in a process control system 100. In general, a recipe control module 504 can include multiple unit recipes, which define production requirements for a unit in the process control system 100. A unit represents a collection of associated control modules and equipment modules (such as SCMs and CMs).

Figure 7A:
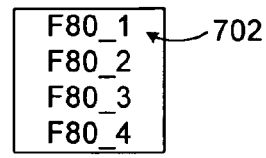
Figure 7B:
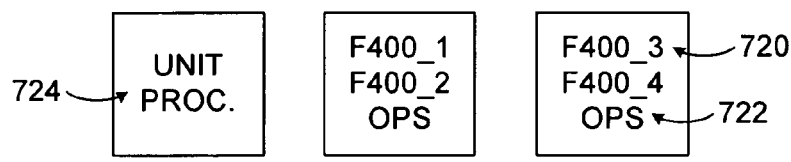
Figure 7C:
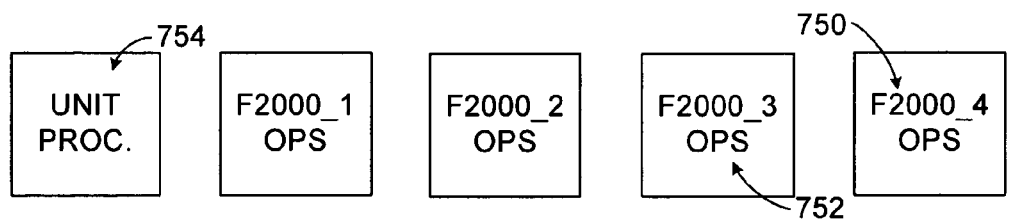
Figure 7D:
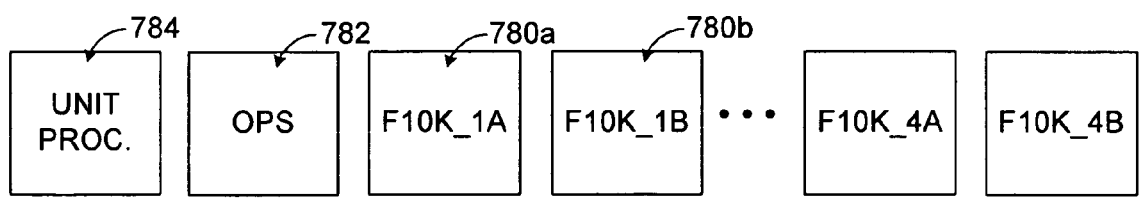

As shown in FIG. 7A, all unit recipes 702 associated with the same class can be stored on a single controller. This single controller generally has access to all unit recipes, as well as a unit procedure defining the operations that need to be performed and an algorithm for initializing, organizing, and controlling these operations. In FIG. 7B, unit recipes 720 associated with the same class are stored on multiple controllers. Each controller also has access to the operations 722 associated with those unit recipes 720. A unit procedure 724 defining the overall procedure to be followed is stored on one of the controllers. As shown in FIG. 7C, each unit recipe 750 is stored on a separate controller, along with its associated operations 752. A unit procedure 754 is stored on one of the controllers. In FIG. 7D, each unit recipe is distributed across multiple controllers (such as unit recipe 780a-780b). The operations 782 and the unit procedure 784 are also distributed and-stored in separate controllers.

As noted above, resource arbitration details can be viewed in graphical user interfaces associated with various resources. For example, a graphical user interface 800 associated with a unit control module 502 is shown in FIG. 8. Among other things, the graphical user interface 800 contains an arbitration tab 801. Selection of the arbitration tab 801 reveals a list 802 of identifiers and names of any recipe control modules 504 in the arbitration queue 516. The graphical user interface 800 also includes information 804 identifying the recipe control module 504 identified by the active control recipe pointer 514.

Using the graphical user interface 800, a user could control the recipe control modules 504 within the arbitration queue 516. For example, the user could select and drag entries in the list 802 to change the order of the recipe control modules 504 in the queue 516. The user could also delete recipe control modules 504 listed in the arbitration queue 516, such as by selecting one or more recipe control modules 504 and pressing the "Delete" button on a keyboard or a "Remove Selected Item" button 806. The user could optionally choose to view parameters of the recipe control modules 504 by selecting a checkbox 808.

Figure 9:
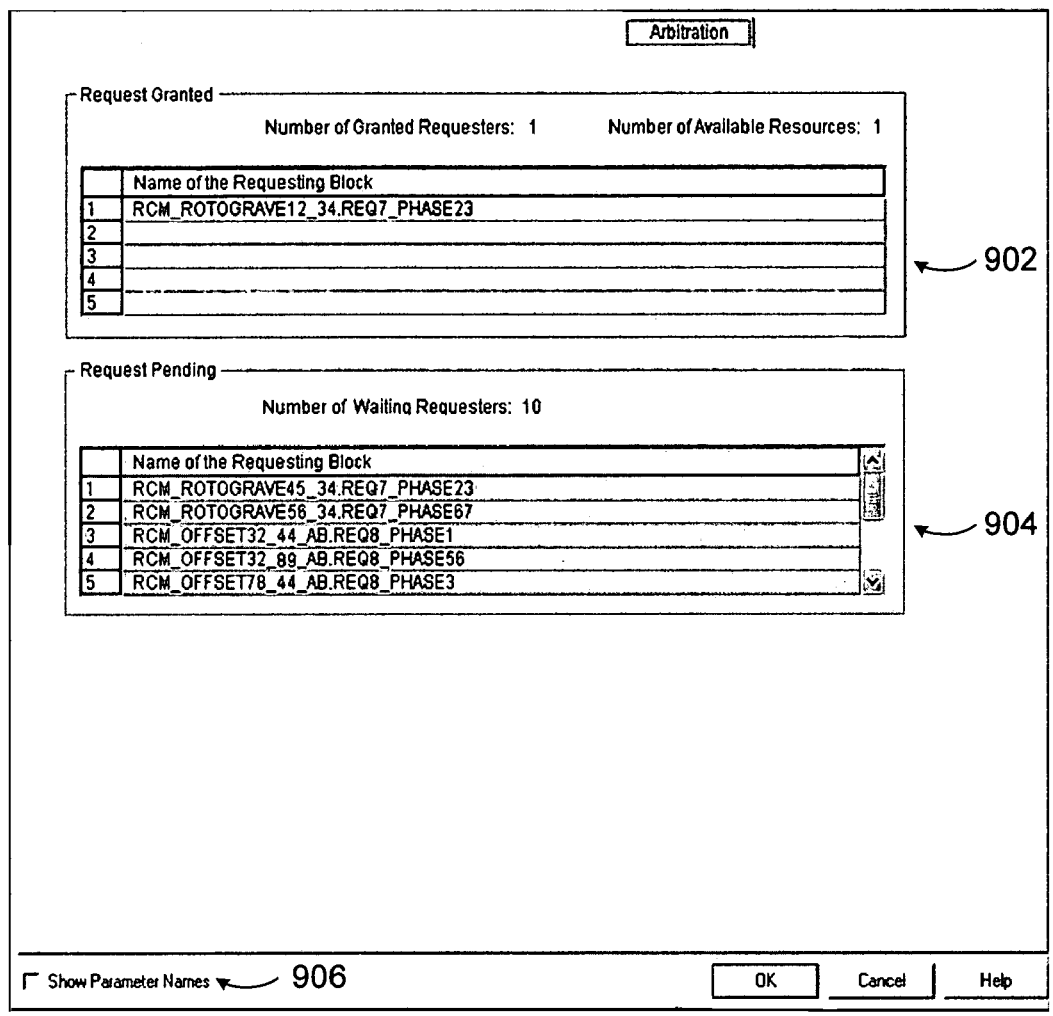

A graphical user interface 900 associated with a sequential control module 506 is shown in FIG. 9. The graphical user interface 900 identifies the recipe control modules 504 (or the phases of the recipe control modules 504) that have acquired or are waiting to acquire the sequential control module 506. In this example, the graphical user interface 900 includes a current acquisition section 902, which identifies the recipe control module(s) 504 or phase(s) that currently own the sequential control module 506. A single owner is shown in this example because the sequential control module 506 represents an "exclusive use" resource. In other embodiments, a sequential control module 506 could represent a non-exclusive use resource, and multiple owners could be listed in the current acquisition section 902. The graphical user interface 900 also includes a pending acquisition section 904, which identifies zero or more recipe control module(s) 504 or phase(s) that are waiting to acquire the sequential control module 506. These recipe control module(s) 504 or phase(s) are listed in the arbitration queue 518. The user could optionally choose to view parameters of the recipe control modules 504 or phases by selecting a checkbox 906.

Using the graphical user interfaces 800 and 900, a user can view the current status of resource usage in the process control system 100. The user can determine which requester(s) have acquired a particular resource and which requesters (if any) are waiting to acquire that resource. The user could also select one of the requesters to view details about that requester (such as by double-clicking on a recipe control modules 504 or phase). In addition, the user can at least partially control the arbitration requests, such as by moving requests within a queue or deleting requests. The graphical user interfaces 800 and 900 or another tool could also provide support for managing request priorities and performing "cleanup" operations when a requester cannot cancel its request or release an acquired resource.

In some embodiments, the usage of the arbitration queues 516 and 518 is configurable by a user. In particular embodiments, the arbitration queue 516 in a unit control module 502 is always "exclusive use," and the arbitration queue 518 in a sequential control module 506 could be defined using a configuration form for the sequential control module 506. The options for the arbitration queue 518 could include:

"none" (no resource allocation is required);

"dedicated" (SCM is dedicated to the same UCM already allocated to a requesting RCM);

"exclusive shared" (SCM is shared by multiple UCMs, but only one UCM can be active at any point in time); and "non-exclusive shared" (SCM is shared by multiple UCMs, and multiple UCMs and RCMs can be active at any point in time).

Various error recovery scenarios can arise and be handled by the resource arbitration mechanism in the process control system 100. For example, a requester may be unable to acquire a resource 204 that lacks a queue 206. In this situation, the requester may monitor the ownership information of a resource 204. As soon as the resource 204 becomes available, the requester may repeat its request, which is normally honored by the resource 204. If the resource 204 cannot be acquired (such as when two or more requesters are in the same situation), this process may repeat until the resource 204 is acquired. This scenario may have no adverse effects, and recovery may be completely automatic.

A requester could also be queued in an arbitration queue 516 or 518 but be forced out of the queue by a higher priority requester. Here, the requester may repeat its request, such as on a periodic basis. When the queue 516 or 518 has one or more free positions again, the request is placed into the queue 516 or 518. The resource 204 will be assigned to the requester when the resource 204 becomes available and the requester is first in the queue 516 or 518. Again, this scenario may have no adverse effects, and recovery may be completely automatic.

A resource 204 could also be unexpectedly deleted while it is acquired by a requester. The requester may recognize the absence of the resource 204 through an existing connection, which returns a communication error. If the requester is a standalone requester (a requester function block 302), no further action may be necessary. If the requester is built into a recipe control module 504 or a phase function block 512, the error may be propagated in any suitable fashion, and a suitable response may occur (such as the recipe control module 504 going into a "Held" state).

Upon recovery of the resource 204, the requester could release the resource, and a release command from the requester is executed to place the requester in an initial state. However, the recovery of the resource 204 may not require reloading of the requester and reestablishment of connections to the resource 204. In this case, the requester may perform a normal acquisition request for the resource 204. If acquired, the requester may continue execution using the resource. Recovery of the resource 204 may or may not be guaranteed. For example, recovery could be guaranteed if only one requester owned the resource 204 at the time of deletion and no new requesters have requested acquisition of the resource 204 since the time of the recovery.

It is also possible that a requester has acquired a resource 204 and is then terminated or deleted, either in an orderly or disorderly manner. An orderly deletion of a requester may occur, for example, with stand-alone requester function blocks 302 and recipe control modules 504 (if the RCM can be deleted in a state where it or its phase function blocks 512 did not release all resources). In this scenario, during the delete operation, the requester may send a release request to a resource 204, and the delete operation may be delayed until the release request has been confirmed by the resource 204. If the release request is not confirmed, the delete operation can be rejected.

The disorderly deletion or unexpected destruction of a requester could occur without a resource 204 being released first. Examples of this could include performance of a forced deletion while peer-to-peer communication is interrupted, or a power-cycle of a component (such as a controller) with the requester while the resource 204 is in a different component. In these situations, the resource 204 remains owned by the requester, which represents an inconsistent system state. Recovery could include reloading the resource 204, which may reinitiate the resource 204. Recovery could also include reloading the requester and having the requester reacquire the resource 204. Because reacquisition may have no effect on the side of the resource 204, this may restore a consistent system state between the requester and the resource 204. Recovery could further include removing the requester from the resource 204 using a maintenance interface of the resource 204.

In addition, a recipe control module 504 could fail to release all resources 204 acquired by phase blocks 512 when the recipe control module 504 reaches a terminal state. This may occur, for example, if a user configured any phase block 512 to not release a sequential control module 506 after use, and no other phase block 512 released the sequential control module 506 before the terminal state. This could also occur if the user did not configure the recipe control module 504 to execute a phase block 512 configured to release the sequential control module 506, or if recipe execution took a path where none of the executed phase blocks 512 released the sequential control module 506. This could represent an intentional act on the part of the user, or it could represent a mistake or unintended consequence. If it was intended, the user could change and re-execute the recipe control module 504 so that a phase block 512 configured to release the sequential control module 506 is executed. If it was unintended, the user could force the RELIN parameter of a phase block 512 to force release of a resource 204, or the user could set an option in the recipe control module 504 to release all resources 204 after reaching a terminal state.

In particular embodiments, the process control system 100 serializes all store requests for function block parameters. The resource arbitration mechanism may rely on this feature, and all resource request and release processing may be performed during the store function of a parameter receiving the requests. The requests may be atomic, and only requesters may have the capability to perform these store operations. Other blocks may lack the appropriate connectors with the correct structure type. If multiple requests occur within a single period of execution of a resource 204 or within a time that cannot be resolved by event processing (such as less than one second), these requests may be serialized in a pseudo-random fashion (as seen from the users' perspective).

In order to reduce or minimize the possible delay caused by the resource arbitration, various constraints may be imposed in the process control system 100. This may help to ensure that the resource arbitration mechanism can be used in hard and soft real-time environments. For example, if a resource 204 and a requester are within the same execution environment (such as in the same controller), the request from the requester may be executed in a synchronous fashion, and the result may be immediately available to the requester. If the resource 204 is available and can be acquired by the requester, the requester can acquire the resource immediately and can continue with its other execution.

If the requester and the resource 204 are distributed within one cluster of the process control system 100, the request of the requester may be executed in an asynchronous fashion. The requester waits for at least a time period equal to a complete round trip (the travel time of the store request from the requester to the resource 204 plus the travel time of the store result from the resource 204 to the requester). Although the requester may monitor a parameter of the resource 204, the requester need not depend on this parameter if the resource 204 immediately fulfills the acquisition request. In this case, the requester may use the return result to continue execution. Otherwise, the requester may act on the monitored parameter (if the parameter carries information about the successful acquisition) before the return result of the store becomes available to the requester.

If the requester and the resource 204 reside in different clusters or a third-party application, arbitration directly with the resource 204 may not be possible because the required structure data stores for atomic processing may not be performed. In this case, arbitration can be achieved using a proxy-requester within the target cluster. Some requesters (such as stand-alone requester function blocks 302) can be controlled with scalar data stores. The required scalar data (such as Boolean and integer values) could be transported on all field buses and may be supported by all interfaces in the process control system 100. The additional time needed for value transport to and from the proxy-requester and the additional time needed for proxy-requester execution (which could be two or execution periods) can be considered by the requester.

The user-configurable resource arbitration mechanism can be used in process control systems 100 that require real-time operations. This includes process control systems 100 with hard real-time conditions. To facilitate operation in these types of environments, the resource arbitration mechanism could have worst-case response times that are predictable and guaranteed. Also, within the implementation limits of the platform hosting the resource arbitration mechanism, there may be no slowdown of the arbitration with increasing numbers of requesters and resources. In addition, the real-time behavior may be maintained across a distributed network as long as all controllers and networks are real-time capable.

Figure 10:
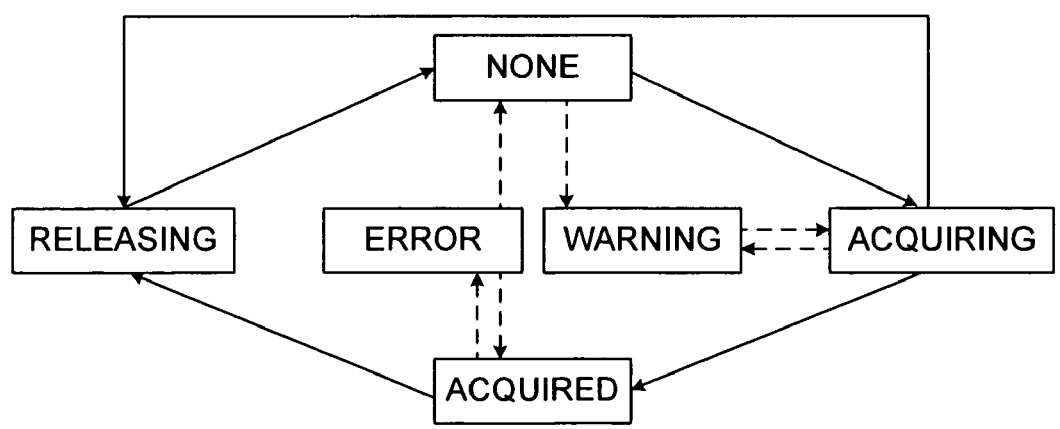

FIG. 10 illustrates an example state model for a requester, such as a requester function block 302. Table 7 describes the states shown in FIG. 10.

TABLE 7

| State | Description | Kind | Remarks |
|---|---|---|---|
| NONE | Requester does not own a resource, and no request is pending | Initial and final | Normal state after load |
| ACQUIRING | Requester does not own a resource, but an acquisition request is pending | Transient | Within the same CEE, the time within this state may go to zero if the resource has a queue, although the time within this state may be long. The requester may repeat its acquisition request with a slow background period to recover from potential errors, such as the requester is pushed out of the queue by higher priority requests or the queue is full (or does not exist) |
| ACQUIRED | Requester owns a resource, and no request is pending | Final | |
| RELEASING | Requester owns a resource, and a release request is pending | Transient | Within the same CEE, the time within this state may go to zero. The time in this state may normally not exceed the sum of all required travel times and execution times to process the release request. |
| WARNING | Requester cannot communicate with a resource for some unknown situation | Transient | This state may occur if the resource was deleted or due to a communication problem. |
| ERROR | Requester lost the resource for some unknown situation | Transient | This state may occur if the resource was deleted or the requester was otherwise removed from the ownership information of the resource |

Table 8 describes the state transitions shown in FIG. 10.

TABLE 8

| FROM | TO | WHEN | REMARKS |
|---|---|---|---|
| NONE | ACQUIRING | Requester commanded to acquire resource | Caused at requester |
| ACQUIRING | ACQUIRED | Resource acquired successfully | Caused by feedback from resource |
| ACQUIRED | RELEASING | Requester commanded to release resource | Caused at requester |
| RELEASING | NONE | Resource released successfully | Caused by feedback from resource |
| ACQUIRING | RELEASING | Requester commanded to release resource | Caused at requester, transition will occur if "waiting" requester cancels request (e.g. recipe abort) |
| ACQUIRING | WARNING | Communication to resource not possible | Caused by feedback from resource, communication to resource is lost |
| ACQUIRED | ERROR | Resource lost | Caused by feedback from resource, resource indicates that no ownership exists or communication to resource is lost |
| ERROR | ACQUIRED | Resource recovered | Caused by feedback from resource, communication to resource was reestablished |
| ERROR | NONE | Requester commanded to release resource, and requester gave up | Caused at requester, post-loss release to confirm non-ownership |
| WARNING | ACQUIRING | Requester commanded to (re)acquire resource | Caused at requester, and if communication is not possible the state will fall back to WARNING according the rule defined for ACQUIRING-> WARNING. |

Figure 11:
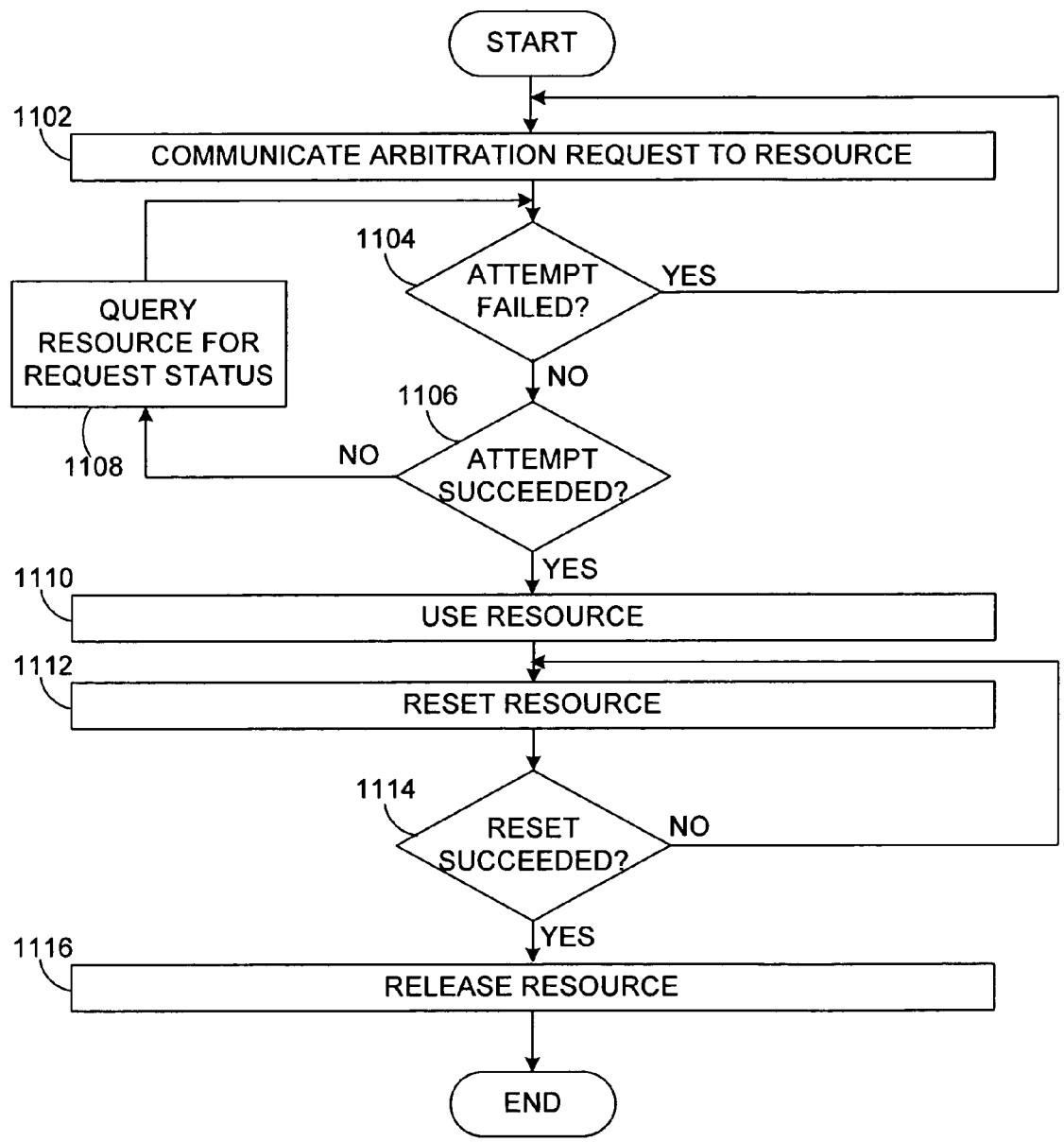
FIG. 11 illustrates an example method for user-configurable resource arbitration in a process control system in accordance with this disclosure.

FIG. 11 illustrates an example method 1100 for user-configurable resource arbitration in a process control system in accordance with this disclosure. For ease of explanation, the method 1100 is described with respect to the process control system 100 of FIG. 1. The method 1100 could be used in any other suitable device or system.

A requester communicates an arbitration request to a resource at step 1102. This may include, for example, a requester function block 302 communicating an arbitration request to a resource function block 304. As a particular example, this may include a recipe control module 504 communicating an arbitration request to a unit control module 502, a sequential control module 506, or a control module 508.

If the arbitration request fails at step 1104, the requester may return to step 1102 to communicate another arbitration request. The arbitration request could fail for any number of reasons, such as an acquired resource 204 having no queue 206 or a full queue 206. The requester could determine that the arbitration request failed by detecting a FAIL status message.

If the arbitration request does not succeed at step 1106, the requester's arbitration request has been placed into the queue 206 of the resource 204, and the requester enters the ACQUIRING state. The arbitration request could succeed if the requester now owns the resource 204. The requester could determine that the arbitration request succeeded by detecting an OK status message. The requester may query the resource 204 on the status of its arbitration request at step 1108. This may include, for example, the requester re-transmitting its arbitration request to the resource 204. As long as the requester does not determine that its arbitration request has succeeded or failed, the requester may repeatedly or periodically query the resource 204.

After a successful arbitration request, the requester has acquired the resource 204. The requester then uses the resource at step 1110. The requester may use the resource 204 in any suitable manner. For example, the resource 204 could represent a sequential control module 504, and the requester could represent a recipe control module 504. In this case, the recipe control module 504 could place the sequential control module 504 into the appropriate mode, program formula parameters into the sequential control module 504, and command the sequential control module 504 to begin operations. The recipe control module 504 could also query the state of the sequential control module 504 and determine when the sequential control module 504 enters a terminal state.

Once use of the resource is complete, the requester can reset the resource at step 1112. This could include, for example, the requester transmitting a reset request to the resource 204. The requester determines if the reset was successful at step 1114. If not, the requester may return to step 1112 to repeat the resetting. Otherwise, the requester releases the resource at step 1116. This could include, for example, the requester transmitting a release request to the resource 204 and receiving a message indicating the release succeeded or failed. If it failed, an appropriate warning or recovery mechanism could be invoked.

Although FIG. 11 illustrates one example of a method 1100 for user-configurable resource arbitration in a process control system, various changes may be made to FIG. 11. For example, various steps could be added, omitted, or combined according to particular needs. Also, a time period could elapse before repeating an arbitration request at step 1102 or a reset request at step 1112, such as a period of five to thirty seconds. In addition, the requester is shown as determining if an arbitration request failed before determining if it succeeded. This is for illustration only. These steps could be reversed or occur concurrently.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
    at least one memory operable to store (i) a resource object associated with a resource and (ii) a plurality of requester objects associated with at least a portion of one or more processes, the one or more processes associated with production of one or more products using the resource; and
    at least one processor operable to arbitrate between multiple arbitration requests from multiple ones of the requester objects, each arbitration request indicating that one of the requester objects is attempting to acquire the resource object so that the associated resource is used to produce one of the products, the at least one processor operable to use one or more user-defined strategies to arbitrate between the multiple arbitration requests;

wherein at least one of the requester objects is operable to repeatedly submit arbitration requests to the resource object until the resource object is acquired;
wherein the repeated arbitration requests by one of the requester objects do not cause multiple acquisitions of the resource object by the requester object and do not require multiple releases of the resource object by the requester object; and
wherein the at least one processor is further operable to generate a graphical user interface showing contents of (i) a queue identifying requester objects that have requested and not yet acquired the resource object and (ii) a pointer identifying the requester object that has acquired and not released the resource object, wherein the contents of the queue and the pointer are modifiable by a user.

2. The system of claim 1, wherein the one or more user-defined strategies comprise at least one of:
a priority associated with each of the requester objects;
a maximum number of requester objects that can concurrently own the resource object; and
a user-defined queue associated with the resource object, the queue having a user-defined number of entries.

3. The system of claim 1, wherein the one or more user-defined strategies comprise at least one of:
a number of times that each requester object is operable to submit arbitration requests to the resource object; and
a time period between submissions of arbitration requests to the resource object.

4. The system of claim 1, wherein:
the resource object comprises a plurality of resource function blocks; and
the requester objects comprise a plurality of requester function blocks.

5. The system of claim 4, wherein:
at least one of the requester function blocks is incorporated into a first function block; and
at least one of the resource function blocks is incorporated into a second function block.

6. The system of claim 5, wherein:
the first function block comprises a recipe control module associated with a procedure for producing a batch of one of the products, the procedure comprising a plurality of phases; and
the second function block comprises at least one of:
a unit control module associated with a piece of processing equipment; and
a sequential control module operable to implement one of the phases.

7. The system of claim 6, wherein:
the recipe control module is operable to acquire the unit control module to initiate production of the batch of the product using the piece of processing equipment; and
the recipe control module is operable to acquire the sequential control module to initiate execution of one of the phases.

8. The system of claim 7, wherein:
multiple recipe control modules are operable to request acquisition of the unit control module; and
the unit control module comprises:
the pointer, which is operable to identify the recipe control module that has acquired the unit control module; and
the queue, which is operable to identify one or more recipe control modules waiting to acquire the unit control module.

9. The system of claim 8, wherein:
multiple phases of one of the recipe control modules are operable to request acquisition of the sequential control module; and
the sequential control module comprises a second queue operable to identify one or more phases waiting to acquire the sequential control module.

10. The system of claim 9, wherein:
the graphical user interface is associated with the unit control module; and
contents of the second queue are viewable by the user using a second graphical user interface associated with the sequential control module.

11. The system of claim 9, wherein the one or more user-defined strategies comprise at least one of:
a size of the queue in the unit control module;
a size of the second queue in the sequential control module; and
an indication whether the sequential control module comprises a dedicated sequential control module, an exclusive use sequential control module, or a non-exclusive use sequential control module.

12. The system of claim 3, wherein the function blocks are distributed over multiple controllers in a process control system.

13. The system of claim 1, wherein the at least one processor is operable to arbitrate between the multiple arbitration requests in a real-time manner by providing predictable and guaranteed worst-case response times.

14. A method, comprising:
creating a resource object associated with a resource;
creating a plurality of requester objects associated with at least a portion of one or more processes, the one or more processes associated with production of one or more products using the resource;
submitting arbitration requests from the plurality of requester objects to the resource object, each arbitration request indicating that one of the requester objects is attempting to acquire the resource object so that the associated resource is used to produce one of the products;
arbitrating between multiple arbitration requests from multiple ones of the requester objects using one or more user-defined strategies; and
generating a graphical user interface showing contents of (i) a queue identifying requester objects that have requested and not yet acquired the resource object and (ii) a pointer identifying the requester object that has acquired and not released the resource object, wherein the contents of the queue and the pointer are modifiable by a user;
wherein submitting the arbitration requests comprises at least one of the requester objects repeatedly submitting arbitration requests to the resource object until the resource object is acquired; and
wherein the repeated arbitration requests by one of the requester objects do not cause multiple acquisitions of the resource object by the requester object and do not require multiple releases of the resource object by the requester object.

15. The method of claim 14, wherein the one or more user-defined strategies comprise at least one of:
a priority associated with each of the requester objects;
a maximum number of requester objects that can concurrently own the resource object; and
a user-defined queue associated with the resource object, the queue having a user-defined number of entries.

16. The method of claim 14, wherein the one or more user-defined strategies comprise at least one of:
a number of times that each requester object is operable to submit arbitration requests to the resource object; and
a time period between submissions of arbitration requests to the resource object.

17. The method of claim 14, wherein:
the resource object comprises a plurality of resource function blocks; and
the requester objects comprise a plurality of requester function blocks.

18. The method of claim 17, further comprising:
incorporating at least one of the requester function blocks into a first function block; and
incorporating at least one of the resource function blocks into a second function block.

19. The method of claim 18, wherein:
the first function block comprises a recipe control module associated with a procedure for producing a batch of one of the products, the procedure comprising a plurality of phases; and
the second function block comprises at least one of:
a unit control module associated with a piece of processing equipment; and
a sequential control module operable to implement one of the phases.

20. The method of claim 19, further comprising:
acquiring the unit control module by the recipe control module to initiate production of the batch of the product using the piece of processing equipment; and
acquiring the sequential control module by the recipe control module to initiate execution of one of the phases.

21. The method of claim 20, wherein:
submitting the arbitration requests comprises:
multiple recipe control modules requesting acquisition of the unit control module; and
multiple phases of one of the recipe control modules requesting acquisition of the sequential control module;
the unit control module comprises:
the pointer, which is operable to identify the recipe control module that has acquired the unit control module; and
the queue, which is operable to identify one or more recipe control modules waiting to acquire the unit control module; and
the sequential control module comprises a second queue operable to identify one or more phases waiting to acquire the sequential control module.

22. The method of claim 21, wherein the graphical user interface is associated with the unit control module; and
further comprising providing contents of the second queue for viewing by the user using a second graphical user interface associated with the sequential control module.

23. The method of claim 21, wherein the one or more user-defined strategies comprise at least one of:
a size of the queue in the unit control module;
a size of the second queue in the sequential control module; and
an indication whether the sequential control module comprises a dedicated sequential control module, an exclusive use sequential control module, or a non-exclusive use sequential control module.

24. A computer program embodied on a computer readable medium, the computer program comprising computer readable program code for:
creating a resource object associated with a resource;
creating a plurality of requester objects associated with at least a portion of one or more processes, the one or more processes associated with production of one or more products using the resource;
arbitrating between multiple arbitration requests from multiple ones of the requester objects using one or more user-defined strategies, each arbitration request indicating that one of the requester objects is attempting to acquire the resource object so that the associated resource is used to produce one of the products; and
generating a graphical user interface showing contents of (i) a queue identifying requester objects that have requested and not yet acquired the resource object and (iii a pointer identifying the requester object that has acquired and not released the resource object, wherein the contents of the queue and the pointer are modifiable by a user;
wherein at least one of the requester objects is operable to repeatedly submit arbitration requests to the resource object until the resource object is acquired; and
wherein the repeated arbitration requests by one of the requester objects do not cause multiple acquisitions of the resource object by the requester object and do not require multiple releases of the resource object by the requester object.

25. The system of claim 1, wherein the resource object is associated with:
a first memory space operable to store one or more constant values associated with all of the requester objects; and
a plurality of second memory spaces each operable to store one or more variable values associated with one of the requester objects.

26. The system of claim 1, wherein:
each requester object is associated with a priority;
arbitration requests from at least some of the requester objects are stored in a queue associated with the resource object and sorted in the queue based on priority;
at least one of the requester objects is operable to re-submit its arbitration request using a different priority; and
the at least one processor is operable to update the arbitration request from the at least one requester object using the different priority and to re-sort the arbitration requests in the queue.

* * * * *